US012491544B2

(12) United States Patent
Turner et al.

(10) Patent No.: US 12,491,544 B2
(45) Date of Patent: Dec. 9, 2025

(54) PIPE CLEANING DEVICE

(71) Applicants: Stephen S. Turner, Edelstein, IL (US); Scott I. Turner, Chillicothe, IL (US)

(72) Inventors: Stephen S. Turner, Edelstein, IL (US); Scott I. Turner, Chillicothe, IL (US)

( * ) Notice: Subject to any disclaimer, the term of this patent is extended or adjusted under 35 U.S.C. 154(b) by 342 days.

(21) Appl. No.: 18/117,462

(22) Filed: Mar. 5, 2023

(65) Prior Publication Data

US 2023/0278079 A1 Sep. 7, 2023

Related U.S. Application Data

(60) Provisional application No. 63/316,995, filed on Mar. 5, 2022.

(51) Int. Cl.

| | |
|---|---|
| ***B08B 9/04*** | (2006.01) |
| ***B08B 1/12*** | (2024.01) |
| ***B08B 9/045*** | (2006.01) |
| ***E03C 1/302*** | (2006.01) |
| *A46B 5/00* | (2006.01) |
| *A46B 11/00* | (2006.01) |

(52) U.S. Cl.

CPC ................ *B08B 9/045* (2013.01); *B08B 1/12* (2024.01); *E03C 1/302* (2013.01); *A46B 5/00* (2013.01); *A46B 11/00* (2013.01)

(58) Field of Classification Search

CPC .. B08B 9/00; B08B 9/04; B08B 9/045; E03C 1/302

See application file for complete search history.

(56) References Cited

U.S. PATENT DOCUMENTS

| | | | |
|---|---|---|---|
| 566,110 | A | 8/1896 | Wrigley |
| 984,473 | A | 2/1911 | Cornelius |
| 1,051,992 | A | 2/1913 | Fisher et al. |
| 1,588,737 | A | 6/1926 | Hurd |
| 1,783,256 | A | 12/1930 | Miller |
| 4,174,548 | A | 11/1979 | Dunn |
| 5,231,738 | A | 8/1993 | Higashinaka |
| 5,423,621 | A | 6/1995 | Russell |
| 5,769,960 | A | 6/1998 | Nirmel |

(Continued)

FOREIGN PATENT DOCUMENTS

| | | | |
|---|---|---|---|
| CN | 2490219 | Y | 5/2002 |
| CN | 207170439 | U | 4/2018 |

(Continued)

*Primary Examiner* — Michael D Jennings

(74) *Attorney, Agent, or Firm* — The Law Office of Patrick F. O'Reilly III, LLC

(57) ABSTRACT

A pipe cleaning device includes an elongated rod section having a first end, a second end, and a rod axis, the first end of the elongated rod section being oppositely disposed relative to the second end of the elongated rod section; and a tip section connected to the second end of the elongated rod section, the tip section including a plurality of textile fingers extending radially outward from a central tip portion, at least some of the plurality of textile fingers including a plurality of protruding elements projecting outwardly from a textile finger surface. The first end of the elongated rod section is configured to be coupled to a rotary motion input device that is sufficient to rotate the plurality of textile fingers of the tip section about the rod axis so as to dislodge and grab debris from an interior wall of a pipe.

17 Claims, 5 Drawing Sheets

(56) References Cited

U.S. PATENT DOCUMENTS

| | | | | |
|---|---|---|---|---|
| 5,836,032 | A | 11/1998 | Hondo | |
| 6,131,229 | A | 10/2000 | Lincuna et al. | |
| 6,775,873 | B2 | 8/2004 | Luoma | |
| 6,827,794 | B2 | 12/2004 | Sommerfeld, Sr. | |
| 6,898,807 | B2 | 5/2005 | Tash | |
| 7,584,513 | B2 | 9/2009 | Turner | |
| 7,810,176 | B2 | 10/2010 | Turner | |
| 8,359,696 | B1 | 1/2013 | Turner et al. | |
| 8,745,771 | B2 | 6/2014 | Bates et al. | |
| 9,670,656 | B2 | 6/2017 | Rutkowski et al. | |
| 9,945,108 | B1 * | 4/2018 | Turner | B08B 9/045 |
| 10,047,508 | B2 | 8/2018 | Elliott et al. | |
| 10,072,405 | B2 | 9/2018 | Beck et al. | |
| 10,683,648 | B2 | 6/2020 | Beck et al. | |
| 10,827,823 | B1 * | 11/2020 | Conner | B08B 1/12 |
| 10,857,577 | B2 * | 12/2020 | Turner | B08B 9/04 |
| 11,898,338 | B2 * | 2/2024 | Turner | B08B 9/045 |
| 12,209,400 | B2 | 1/2025 | Turner et al. | |
| 2006/0021123 | A1 | 2/2006 | Turner | |
| 2006/0195994 | A1 | 9/2006 | Hung | |
| 2012/0005849 | A1 | 1/2012 | Tash | |
| 2013/0000680 | A1 * | 1/2013 | Azelton | E03C 1/302<br>134/166 C |
| 2016/0081467 | A1 * | 3/2016 | Vorobyev | A46B 9/023<br>15/160 |
| 2016/0221050 | A1 | 8/2016 | Beck et al. | |
| 2020/0353514 | A1 * | 11/2020 | Turner | E03C 1/302 |
| 2021/0086240 | A1 | 3/2021 | Turner et al. | |
| 2021/0087802 | A1 * | 3/2021 | Turner | E03C 1/302 |
| 2022/0112703 | A1 | 4/2022 | Turner et al. | |
| 2023/0043083 | A1 * | 2/2023 | Turner | A46B 13/08 |
| 2023/0191463 | A1 * | 6/2023 | Turner | B08B 9/045<br>15/104.05 |

FOREIGN PATENT DOCUMENTS

| | | | |
|---|---|---|---|
| FR | 3009007 | A1 | 1/2015 |
| WO | 2013048088 | A1 | 4/2013 |

* cited by examiner

DETAIL "A"

PIPE CLEANING DEVICE

CROSS-REFERENCE TO RELATED APPLICATIONS

This patent application claims priority to, and incorporates by reference in its entirety, U.S. Provisional Patent Application No. 63/316,995, entitled "Pipe Cleaning Device", filed on Mar. 5, 2022.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a pipe cleaning device. More particularly, the invention relates to a pipe cleaning brush for cleaning an interior wall of a pipe.

2. Background

Residential bathroom and kitchen plumbing drain pipes can accumulate debris along the inside surfaces of the pipe through every day use. If not maintained, over time, the drain becomes restricted as the interior pipe opening becomes narrower and narrower.

The average homeowner will find the quickest and easiest maintenance for this type of problem is to pour caustic chemicals down the pipe in an attempt to disintegrate the build-up with the caustic chemical. This method is often effective for the areas of the pipe that the chemical can reach and hopefully accumulate on the interior pipe scum with enough quantity and for a long enough time period to break down and erode the scum. However, vertical pipes and the top half of lateral pipes may not receive enough of the chemical, as the chemical flows by gravity down the line and out of the house as the plumbing system is designed to operate.

As an alternative, homeowners will use more affordable do-it-yourself plumbing snakes with cutter-type ends which mechanically abrade the scum buildup by moving the snake back-and-forth in the drain or attaching the snake to a power drill to create a spinning action and therefore scraping the pipe walls as the tool is moved through the pipe drain. A disadvantage of this type of snake with cutter head is that the drain may need to be disassembled to allow the cutter head to get past drain stopper mechanisms or to navigate tight initial pipe bends, such as a "P" trap.

When all else fails, the homeowner calls a plumber or rents a commercial grade power snake with varying power and cutter/abrading heads which is driven by its own rotating power system but capable of driving the snake with more power than a simple power drill. These methods are costly and sometimes dangerous to use depending upon the spinning power and speed of the unit and shape of the sometimes sharp, spinning head of the snake.

Therefore, what is needed is a pipe cleaning device that is configured to dislodge and grab debris from an interior wall of a pipe.

BRIEF SUMMARY OF EMBODIMENTS OF THE INVENTION

Accordingly, the present invention is directed to a pipe cleaning device that substantially obviates one or more problems resulting from the limitations and deficiencies of the related art.

In accordance with one or more embodiments of the present invention, there is provided a pipe cleaning device that includes an elongated rod section having a first end, a second end, and a rod axis, the first end of the elongated rod section being oppositely disposed relative to the second end of the elongated rod section; and a tip section connected to the second end of the elongated rod section, the tip section including a plurality of textile fingers extending radially outward from a central tip portion, at least some of the plurality of textile fingers including a plurality of protruding elements projecting outwardly from a textile finger surface. In these one or more embodiments, the first end of the elongated rod section is configured to be coupled to a rotary motion input device that is sufficient to rotate the plurality of textile fingers of the tip section about the rod axis; and whereby, upon the plurality of textile fingers of the tip section being rotated by the rotary motion input device, the plurality of protruding elements on the at least some of the plurality of textile fingers are configured to dislodge and grab debris from an interior wall of a pipe.

In a further embodiment of the present invention, the plurality of protruding elements on the plurality of textile fingers comprise a plurality of micro-hooks.

In yet a further embodiment, the plurality of textile fingers are formed from a hook side of a hook-and-loop fastener textile material that comprises the plurality of micro-hooks.

In still a further embodiment, the plurality of textile fingers are arranged on opposed sides of the central tip portion of the tip section.

In yet a further embodiment, the plurality of textile fingers are arranged in a generally rectangular configuration on the opposed sides of the central tip portion of the tip section.

In still a further embodiment, the tip section has a width between approximately one inch and approximately four inches so as to substantially correspond to an interior dimension of common sanitary pipe sizes.

In yet a further embodiment, a distal end of the tip section is substantially V-shaped.

In still a further embodiment, the plurality of textile fingers are resilient and bendable so as to allow the tip section to fold over for insertion into a sink drain alongside the drain stopper.

In yet a further embodiment, the pipe cleaning device further comprises a power tool adapter configured to couple the first end of the elongated rod section to the rotary motion input device, the power tool adapter includes an adapter body with a shank section for being inserted into a recess of the rotary motion input device.

In still a further embodiment, the rotary motion input device for rotating the elongated rod section is selected from the group consisting of: (i) a drill, (ii) a screwdriver, (iii) a power drill, (iv) a power screwdriver, and (v) a hand crank.

In yet a further embodiment, the elongated rod section further includes a plurality of protruding elements projecting outwardly from the elongated rod section, the plurality of protruding elements being disposed at least partially around a periphery of the elongated rod section and along at least a portion of a length of the elongated rod section between the first end and the second end.

In still a further embodiment, the elongated rod section further comprises a central core portion and an outer covering bonded to the central core portion, the outer covering formed from a hook material strip, the hook material strip comprising the plurality of protruding elements of the elongated rod section, and the hook material strip being made from a hook side of a hook-and-loop fastener material.

In yet a further embodiment, the central core portion is formed from a semi-flexible cable, the semi-flexible cable comprising a plurality of inner wires surrounded by an outer sheathing, the hook material strip being bonded to the outer sheathing of the semi-flexible cable.

In still a further embodiment, the central core portion is formed from a plastic core.

In yet a further embodiment, the pipe cleaning device is configured to be discarded after being used to dislodge and grab debris from an interior wall of a pipe.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 1:
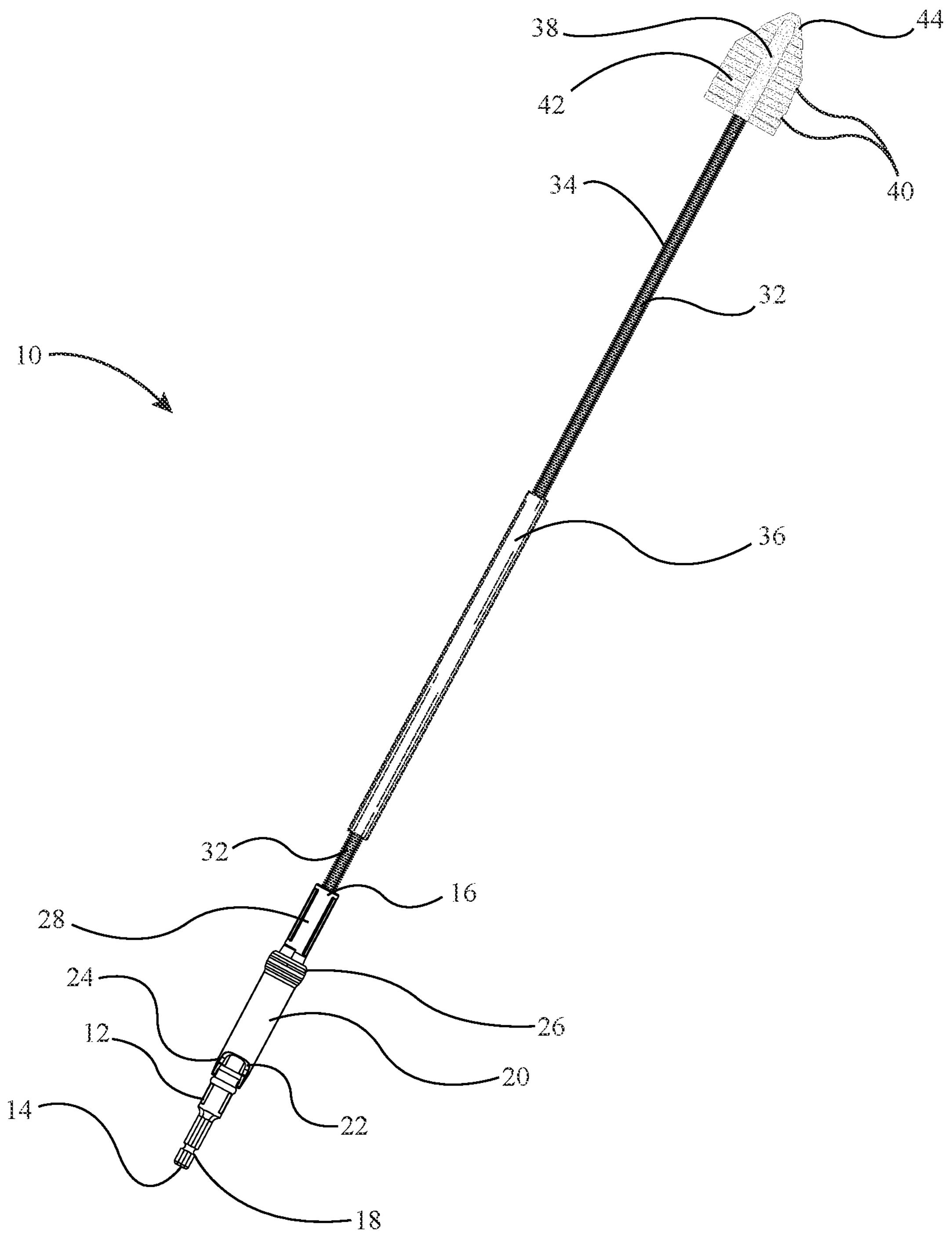
FIG. 1 is a perspective view of a pipe cleaning device, according to an illustrative embodiment of the invention, wherein the pipe cleaning device includes a power tool adapter for attaching the pipe cleaning device to a power tool.

A first illustrative embodiment of a pipe cleaning device is seen generally at 10 in FIGS. 1-5 and 7. The pipe cleaning device 10 is used for removing pipe scaling from an interior wall of a pipe. With initial reference to FIGS. 1 and 2, it can be seen that the pipe cleaning device 10 generally comprises an elongated rod section 32 having a first end, a second end, and a rod axis, the first end of the elongated rod section 32 being oppositely disposed relative to the second end of the elongated rod section 32; and a tip section 38 connected to the second end of the elongated rod section 32, the tip section 38 including a plurality of textile fingers 40 extending radially outward from a central tip portion, each of the plurality of textile fingers 40 including a plurality of protruding elements 42 projecting outwardly from a textile finger surface. In the illustrative embodiment, the first end of the elongated rod section 32 is configured to be coupled to a rotary motion input device (e.g., a drill 46—see FIG. 6) that is sufficient to rotate the plurality of textile fingers 40 of the tip section 38 about the rod axis. In the illustrative embodiment, when the plurality of textile fingers 40 of the tip section 38 are rotated by the rotary motion input device (e.g., the drill 46), the plurality of protruding elements 42 on each of the plurality of textile fingers 40 are configured to dislodge and grab debris from an interior wall of a pipe.

Now, with combined reference to FIGS. 1-4, the tip section 38 of the pipe cleaning device 10 will be described in more detail. In the illustrative embodiment, the plurality of protruding elements 42 on the plurality of textile fingers 40 comprise a plurality of micro-hooks. In the illustrative embodiment, the plurality of textile fingers 40 are formed from a hook side of a hook-and-loop fastener textile material that comprises the plurality of micro-hooks 42 (e.g., the plurality of textile fingers 40 may be made from the hook portion of Velcro®). Referring particularly to FIG. 2, it can be seen that, in the illustrative embodiment, the plurality of textile fingers 40 are arranged on opposed sides of the central tip portion of the tip section 38. More specifically, in FIG. 2, the plurality of textile fingers 40 are arranged in a generally rectangular configuration on the opposed sides of the central tip portion of the tip section 38. Also, as shown in FIG. 2, the distal end 44 of the tip section 38 is substantially V-shaped (i.e., generally V-shaped with a flattened base). In the illustrative embodiment, the plurality of textile fingers 40 are resilient and bendable so as to allow the tip section 38 to fold over for insertion into a sink drain alongside the drain stopper.

The illustrative pipe cleaning device 10 described herein includes a novel use of a textile material (commercially known as Velcro®) cut into a rectangular and formed with a chevron shaped leading edge, which is attached to the end of a cable, having protruding fingers 40 cut into both sides and extending laterally from the cable. When the cable is rotated with a common power drill 46, the tiny nylon micro-hooks 42 of the textile fingers 40 strike and clean the drain pipe wall of a typical domestic household plumbing drain system. The micro-hook fingers 40 are resilient and bendable allowing the novel textile cleaning head to fold over for insertion into a drain alongside the drain stopper, or if the drain stopper has only a small opening, then after removal of the drain stopper. The cable may be of any suitable diameter of stranded-type coated wire, but in the illustrative embodiment, consists of vinyl coated aircraft wire with a diameter of 3/16 inch.

Advantageously, in the illustrative embodiment, the 1/8 inch wide fingers 40 of the tip section 38 are covered on both sides with tiny micro-hooks 42 which act as spinning scratcher pads when the cable is placed in a drill and ran at speed. Pipe wall debris is thereby scratched and dislodged from the pipe wall into small pieces, which can then be washed down the pipe and out into the waste system allowing water to flow freely again within the household drainage lines.

The illustrative pipe cleaning device 10 described herein thereby uses a textile material in a new and unexpected way to clean drain pipe wall debris in a manner that is safer and less expensive than do-it-yourself (DIY) or commercial units with sharp cutter heads, while also being safer than caustic chemical drain cleaners and able to reach all interior surfaces of drain pipes that chemicals fail to clean, including vertical pipes and the tops of lateral pipes.

In the illustrative embodiment, pipe cleaning device 10 comprises two (2) rectangular pieces of the hook side of hook and loop textile material and is coated with adhesive on the back side. The rectangle pieces may be any width or length but in the illustrative embodiment is a rectangle which is approximately 1.5 inches wide and approximately 2.0 inches long. The 1.5 inch width being determined to match the interior dimension of a typical domestic sink or tub drain. Larger widths may be created for larger household drain pipes. The two (2) rectangular pieces of the hook portion of hook and loop material is attached to the cable with one piece upside down and situated below the cable end while the other rectangular piece is laid on top of the cable, but aligned with the rectangular piece of hook material below the cable. The two pieces are clamped together under timed pressure and attached to each other while also forming them around the curvature of the cable, and are held together by the cured adhesive. After the adhesive has cured, the rectangular end piece is placed in a stamping press with cutter blades which make lateral cuts which are perpendicular to the cable, creating splayed hook and loop pieces of approximately ⅛ inch width by approximately ¾ inch length in the illustrative embodiment. These individual fingers 40 act like the needles on a Christmas tree branch which can bend and lay down when a hand is run down the branch. The leading edge of the rectangular piece is die-cut in a chevron shape to make the pipe wall cleaning head more easily insertable into a tight drain opening. By cutting and splaying the one combined, larger rectangular hook and loop piece into these ⅛ inch fingers 40, the end of the cable becomes more easily collapsible and can be bent to be pushed past a tight drain stopper openings or similar drain apparatus.

In one or more exemplary embodiments, the tip section 38 may have a width between approximately one inch and approximately four inches so as to substantially correspond to an interior dimension of common sanitary pipe sizes (e.g., common sanitary pipe sizes include 1½ inch diameter, 2 inch diameter, 2½ inch diameter, 3 inch diameter, and 4 inch diameter).

Referring again to FIG. 1, it can be seen that, in the illustrative embodiment, the elongated rod section 32 has a sleeve member 36 rotatably disposed on a longitudinal portion of the elongated rod section 32. In the illustrative embodiment, the sleeve member 36 may be formed from a piece of thin extruded plastic with a slit, or from a thin molded plastic sleeve.

Figure 2:
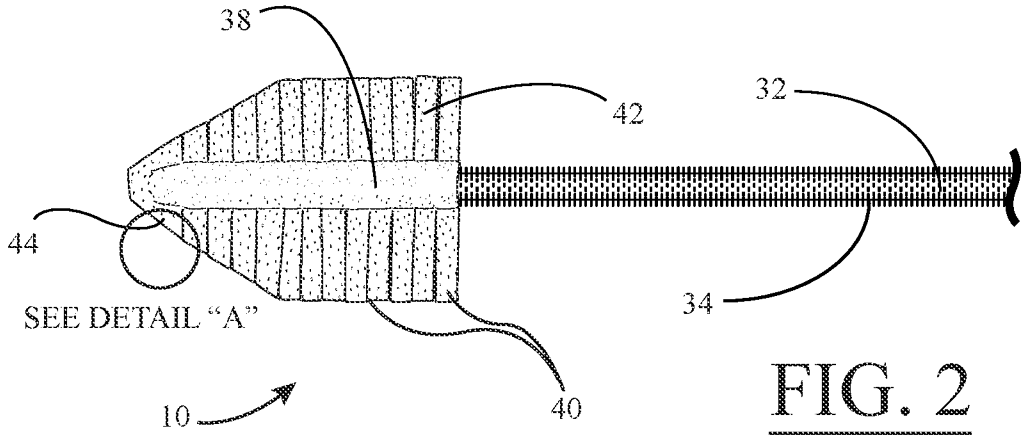
FIG. 2 is an enlarged top view of a tip section of the pipe cleaning device of FIG. 1.
Figure 3:
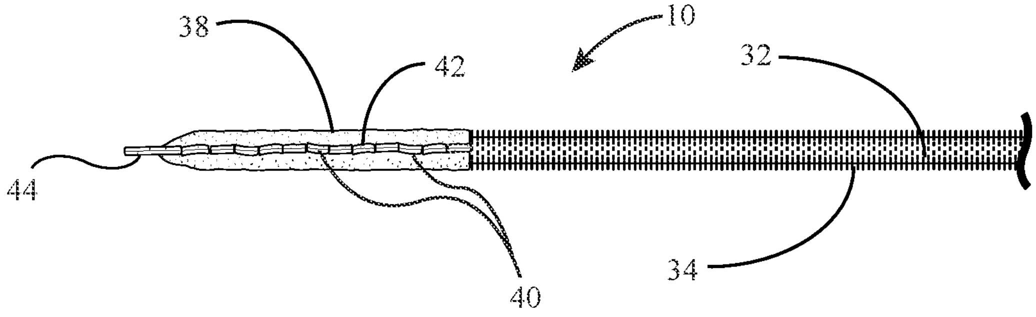
FIG. 3 is an enlarged side view of the tip section of the pipe cleaning device of FIG. 1.
Figure 4:
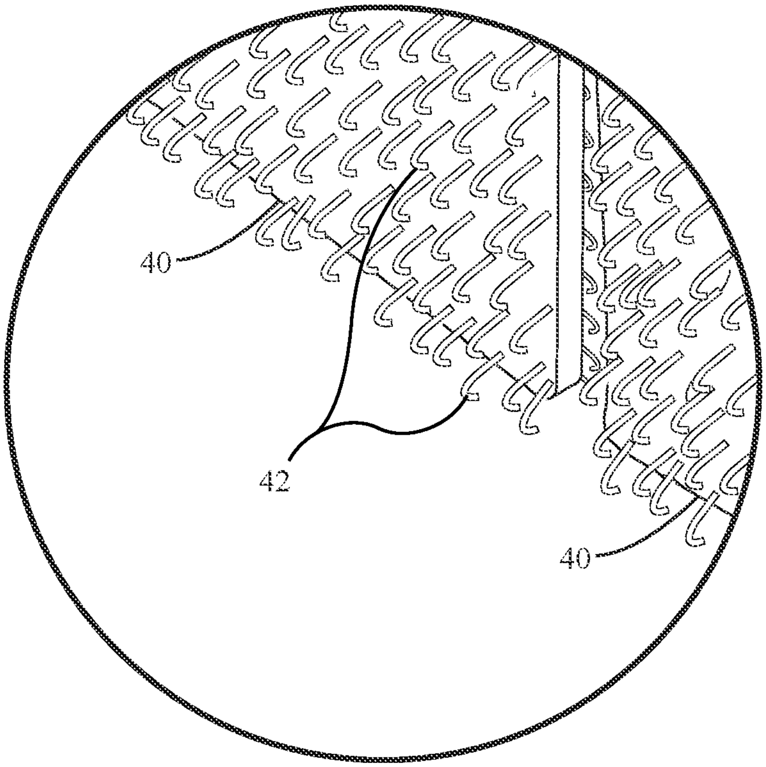
FIG. 4 is an enlarged perspective view of a portion of the tip section in FIG. 2, wherein the hook elements on the protruding fingers of the tip section are illustrated in more detail (Detail "A")
Figure 5:
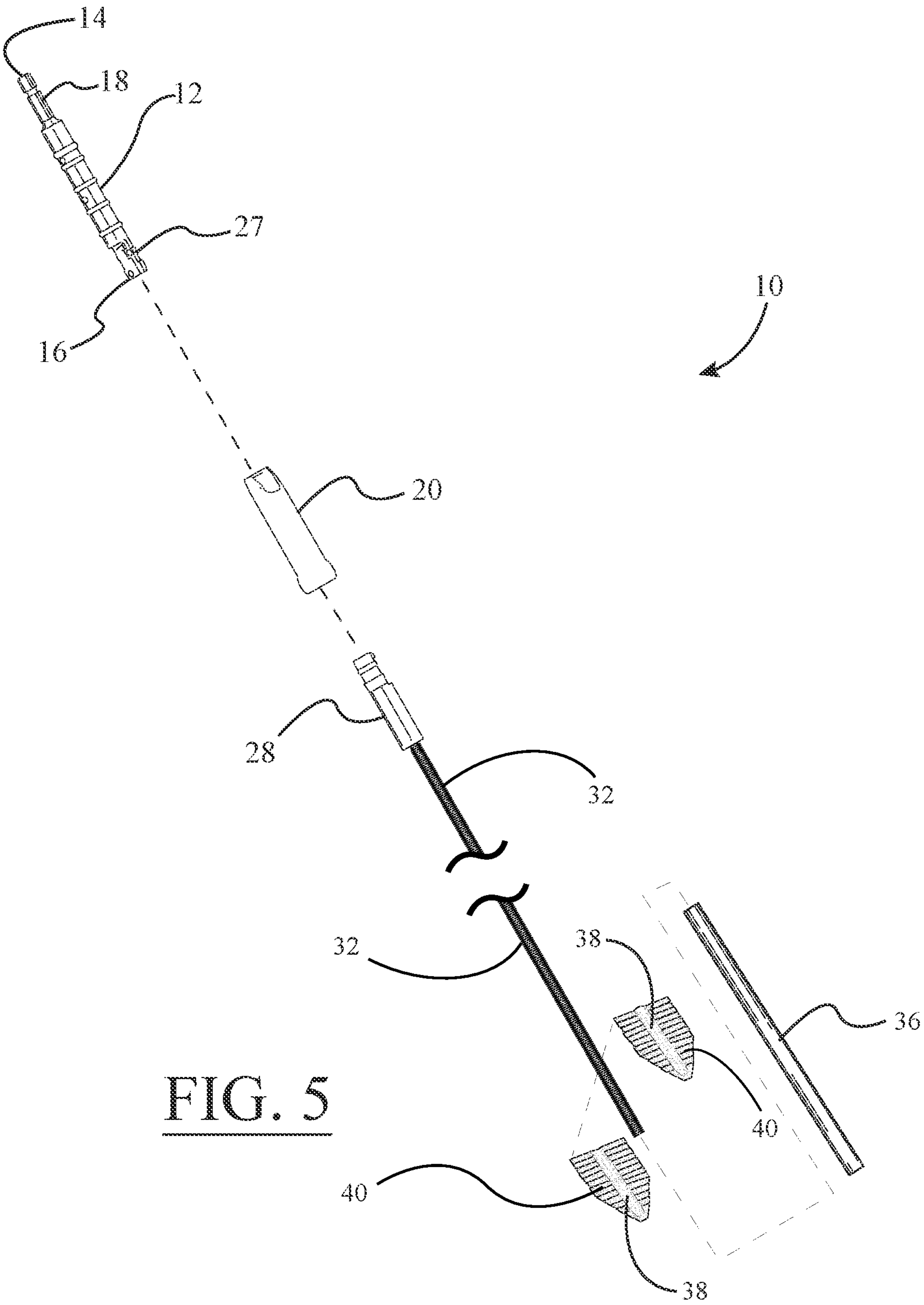
FIG. 5 is an exploded perspective view of the pipe cleaning device of FIG. 1.

Next, with combined reference to FIGS. 1-3, additional features of the illustrative pipe cleaning device 10 will be explained. As shown in these figures, the elongated rod section 32 further includes a plurality of protruding elements 34 projecting outwardly from the elongated rod section 32. In the illustrative embodiment, the plurality of protruding elements 34 are disposed around the outer periphery of the elongated rod section 32 and along the length of the elongated rod section 32 between the first end and the second end. Also, in the illustrative embodiment, the elongated rod section 32 of the pipe cleaning device 10 further comprises a central core portion and an outer covering bonded to the central core portion. In the illustrative embodiment, the outer covering is formed from a hook material strip. More specifically, in the illustrative embodiment, the hook material strip is made from a hook portion of a hook-and-loop fastener material (e.g., made from the hook portion of Velcro®). As such, in the illustrative embodiment, the hook elements of the hook material strip (e.g., the hook portion of Velcro®) form the plurality of protruding elements 34 of the elongated rod section 32 of the pipe cleaning device 10.

In one or more embodiments, the central core portion of the elongated rod section 32 of the pipe cleaning device 10 is formed from a semi-flexible cable. In these one or more embodiments, the semi-flexible cable comprises a plurality of inner metal wires surrounded by an outer plastic sheathing. In the illustrative embodiment, the hook material strip is bonded to the outer plastic sheathing of the semi-flexible cable (e.g., the hook portion of Velcro® is glued onto the outer plastic sheathing of the cable). One or more ends of the central core portion of the pipe cleaning device 10 may be terminated by soldering the inner metal wires of the central core portion so as to avoid loose protruding wires, and to give a more finished appearance to the pipe cleaning device 10. In these one or more embodiments, the semi-flexible cable, which is used for the central core portion of the elongated rod section 32 of the pipe cleaning device 10, may comprise a plastic-coated aircraft cable with a 7/32 inch diameter and a 7×19 wire configuration. In other embodiments, other types of cable are used for the central core portion of the elongated rod section 32 of the pipe cleaning device 10. For example, the semi-flexible cable that is used for the central core portion of the elongated rod section 32 of the pipe cleaning device 10 may have a different wire configuration (e.g., a 1×19 wire configuration), which results in a stiffer wire core portion with fewer strands of wires.

In one or more other embodiments, the central core portion of the elongated rod section 32 of the pipe cleaning device 10 is formed from a plastic core, rather than the semi-flexible cable described above. For example, the plastic core version of the pipe cleaning device 10 may be used for applications where a more rigid elongated rod section 32 is needed. In these one or more embodiments utilizing a plastic core, the hook material strip is bonded to the outer periphery of the plastic core (e.g., the hook portion of Velcro® is glued onto the outer periphery of the plastic core). One or more ends of the plastic core of the elongated rod section 32 of the pipe cleaning device 10 may be terminated by dipping the end of the elongated rod section 32 in glue or plastic so as to avoid sharp edges, and to give a more finished appearance to the pipe cleaning device 10.

Referring again to the illustrative embodiment of FIG. 1, it can be seen that the pipe cleaning device further includes a reusable power tool adapter configured to couple the first end of the elongated rod section 32 to the rotary motion input device (e.g., a drill 46—see FIG. 6), the power tool adapter includes an adapter body 12 with a shank section 18 for being inserted into a recess of the rotary motion input device (e.g., the drill 46). The elongated rod section 32 is attached to the power tool adapter by engagement of the proximal end portion (i.e., the end that is closest to the person when operating the device) of the elongated rod section 32 fully engaged with the distal end portion 16 of the power tool adapter 10. A slidable sleeve member 20 is shown in the engaged position and the elongated rod section 32 of the pipe cleaning device 10, as shown in FIG. 1, is in the fully engaged configuration. The sleeve member 20 in this engaged position ensures that the elongated rod section 32 and power tool adapter are fully engaged, i.e., interlocked at their corresponding ends, and the device is ready for use, such as for clearing a clogged drain pipe or for other similar pipe-cleaning functions.

In the illustrative embodiment, as shown in FIG. 1, the power tool adapter generally comprises an adapter body 12 having a proximal end portion 14 and a distal end portion 16, the proximal end portion 14 of the adapter body 12 being oppositely disposed relative to the distal end portion 16 of the adapter body 12. In FIG. 1, it can be seen that the distal end portion 16 of the adapter body 12 is configured to be coupled to the proximal end portion of the elongated rod section 32. The proximal end portion 14 of the adapter body 12 is configured to be coupled to a rotary motion input device (e.g., a drill 46—see FIG. 6) that is sufficient to rotate the plurality of textile fingers 40 of the tip section 38 about the rod axis of the elongated rod section 32 so as to dislodge and grab debris from an interior wall of a pipe.

In the illustrative embodiment, as shown in FIG. 1, it can be seen that the proximal end portion 14 of the adapter body 12 of the power tool adapter 10 comprises a shank section 18 for being inserted into a recess of the rotary motion input device (e.g., the drill 46). For example, the rotary motion input device for rotating the pipe cleaning device 10 may comprise a drill, a screwdriver, a power drill, or a power screwdriver. In the illustrative embodiment, the power tool adapter is configured for use with a drill, and the shank section at the proximal end portion of the adapter body is in a form of a drill bit shank section 18 for being inserted into a drill chuck recess. In the illustrative embodiment of FIG. 1, the drill bit shank section 18 has a generally hexagonal cross-sectional shape for being inserted into the drill chuck recess. In another embodiment, the drill bit shank section may have a generally circular cross-sectional shape for being inserted into the drill chuck recess.

In the illustrative embodiment, as will be described in further detail hereinafter, a user inserts the drill bit shank section 18 into a drill and tightens the chuck in the same fashion as using a drill bit. The slidable sleeve member 20 moves axially along the center of the power tool adapter between an engaged position (i.e., a locking position) and a disengaged position (i.e., a release position). This sliding action of the sleeve member 20 fully engages or releases the replaceable elongated rod section 32 and the tip section 38, which attaches to the distal end portion 16 of the power tool adapter body 12. Once the drill bit shank section 18 of the power tool adapter is locked into the drill chuck, the user grasps the drill in one hand and the spinning sleeve member 20 with the other hand, and inserts the attached pipe cleaning device 10 into a sink or tub drain to clean the pipe scaling off the walls of the drain pipe. Then, the user simply runs the drill on slow speed and allows the drill to power the pipe cleaning device 10. The user can then detach the removable elongated rod section 32 and the tip section 38 of the pipe cleaning device 10 by sliding the spinning sleeve 20 of the power tool adapter up toward the proximal drill end, exposing the mated, interlocking ends of both the adapter and removable portion of the pipe cleaning device 10, thereby allowing for removal and replacement of the elongated rod section 32 and the tip section 38 of the pipe cleaning device 10.

In the illustrative embodiment, the sleeve member 20 of the power tool adapter can be moved back and forth between two possible positions along the adapter body 12: (i) a disengaged position where the elongated rod section 32 and the tip section 38 of the pipe cleaning device 10 is able to be released from the power tool adapter, and (ii) an engaged position where the distal end portion 16 of the adapter body 12 is locked into engagement with the proximal end portion of the elongated rod section 32. The sleeve member 20 of the power tool adapter has a proximal end 24 and a distal end 26.

After use, the elongated rod section 32 and the tip section 38 of the pipe cleaning device 10 is disengaged from the power tool adapter (as described below) and can be discarded in an appropriate disposal receptacle, or in an appropriate recycling collection container.

In the illustrative embodiment, the sleeve member 20 of the power tool adapter has a generally cylindrical shape, but may include a notch 22 at its proximal end 24 (see FIG. 1). When the sleeve member 20 is moved backward to its disengaged position, the interlocking ends of the elongated rod section 32 and the power tool adapter are exposed and can be detached.

In the illustrative embodiment, the pipe cleaning device 10 is preferably disposable and can be made of any suitable disposable, recyclable or biodegradable material (e.g., a suitable plastic), such as polyethylene, polystyrene, polycarbonate, acrylic polymer, or nylon. The power tool adapter is preferably reusable and can be made of a suitably durable material (e.g., a suitable plastic) to withstand repeated engagement and disengagement with elongated rod sections 32 and the tip sections 38 and repeated use.

Now, with reference to the illustrative embodiment of FIG. 1, the manner in which the pipe cleaning device 10 is attached to a driving power tool (e.g., a drill 46) will be explained. First of all, the drill bit shank section 18 of the power tool adapter is inserted into the chuck 48 of the battery-powered drill 46 by a user, and then the user tightens the jaws of the drill chuck 48 onto the drill bit shank section 18 of the power tool adapter using the tightening collar of the chuck 48. Secondly, the user slides the sleeve member 20 of the power tool adapter into its disengaged position. Then, the user engages the proximal end portion 28 of the elongated rod section 32 of the pipe cleaning device 10 with the connector section 27 at the distal end portion 16 of the power tool adapter. Finally, once the proximal end portion 28 of the elongated rod section 32 of the pipe cleaning device 10 is engaged with the connector section 27 at the distal end portion 16 of the power tool adapter 10, the user slides the sleeve member 20 into its engaged position so as to secure the elongated rod section 32 of the pipe cleaning device 10 to the power tool adapter.

When the pipe cleaning device 10 is in the fully engaged configuration, the pipe cleaning device 10 is ready for use. The distal tip section 38 of the pipe cleaning device 10 can be inserted into a drain pipe to clean the scaling therefrom. The user then places one hand on the sleeve member 36 of the elongated rod section 32 or the sleeve member 20 of the power tool adapter and uses the other hand to hold the drill 46. Pressing the trigger on the drill 46 causes the pipe cleaning device 10 to rotate inside the clogged drain or obstructed pipe, thereby removing obstructing materials. The power tool adapter can be turned indefinitely to rotate the pipe cleaning device 10, thereby continuously collecting debris at the distal end of the pipe cleaning device 10.

Figure 6:
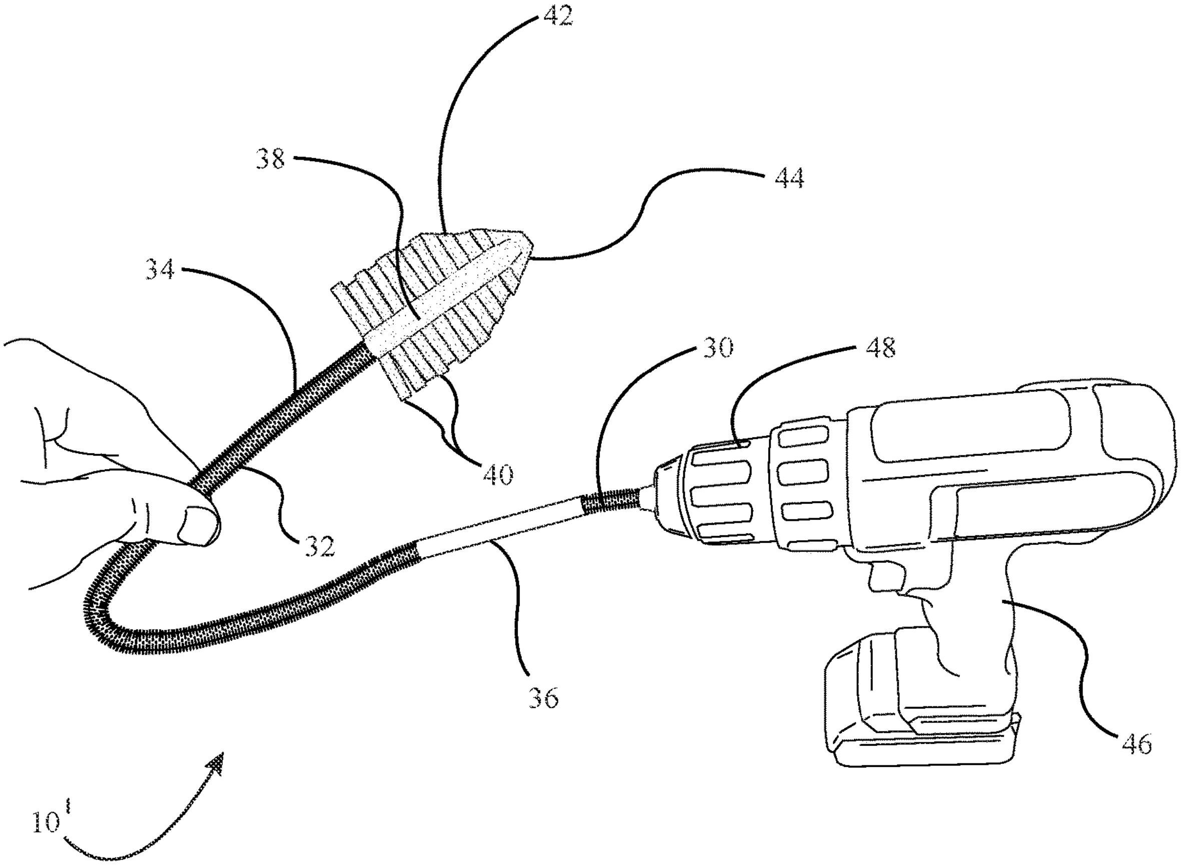
FIG. 6 is a perspective view of a pipe cleaning device attached to a power tool, according to another illustrative embodiment of the invention.

Another illustrative embodiment of the pipe cleaning device is seen generally at 10' in FIG. 6. Referring to this figure, it can be seen that, in many respects, the illustrative embodiment of FIG. 6 is similar to that of the illustrative embodiment of FIGS. 1-5. Moreover, many elements are common to both such embodiments. For the sake of brevity, the elements that the illustrative embodiment of FIG. 6 has in common with the embodiment of FIGS. 1-5 will not be discussed in detail because these components have already been described above.

Like the pipe cleaning device 10 described above, the pipe cleaning device 10' of the illustrative embodiment of FIG. 6 generally comprises an elongated rod section 32 having a first end, a second end, and a rod axis, the first end of the elongated rod section 32 being oppositely disposed relative to the second end of the elongated rod section 32; and a tip section 38 connected to the second end of the elongated rod section 32, the tip section 38 including a plurality of textile fingers 40 extending radially outward from a central tip portion, each of the plurality of textile fingers 40 including a plurality of protruding elements 42 projecting outwardly from a textile finger surface. In the illustrative embodiment of FIG. 6, the first end of the elongated rod section 32 is coupled to a rotary motion input device (e.g., a drill 46) that is sufficient to rotate the plurality of textile fingers 40 of the tip section 38 about the rod axis. However, unlike the pipe cleaning device 10 of the first illustrative embodiment, the pipe cleaning device 10' of the second illustrative embodiment does not include the power tool adapter. Rather, the proximal end portion 30 of the elongated rod section 32 is connected directly to the drill 46.

Figure 7:
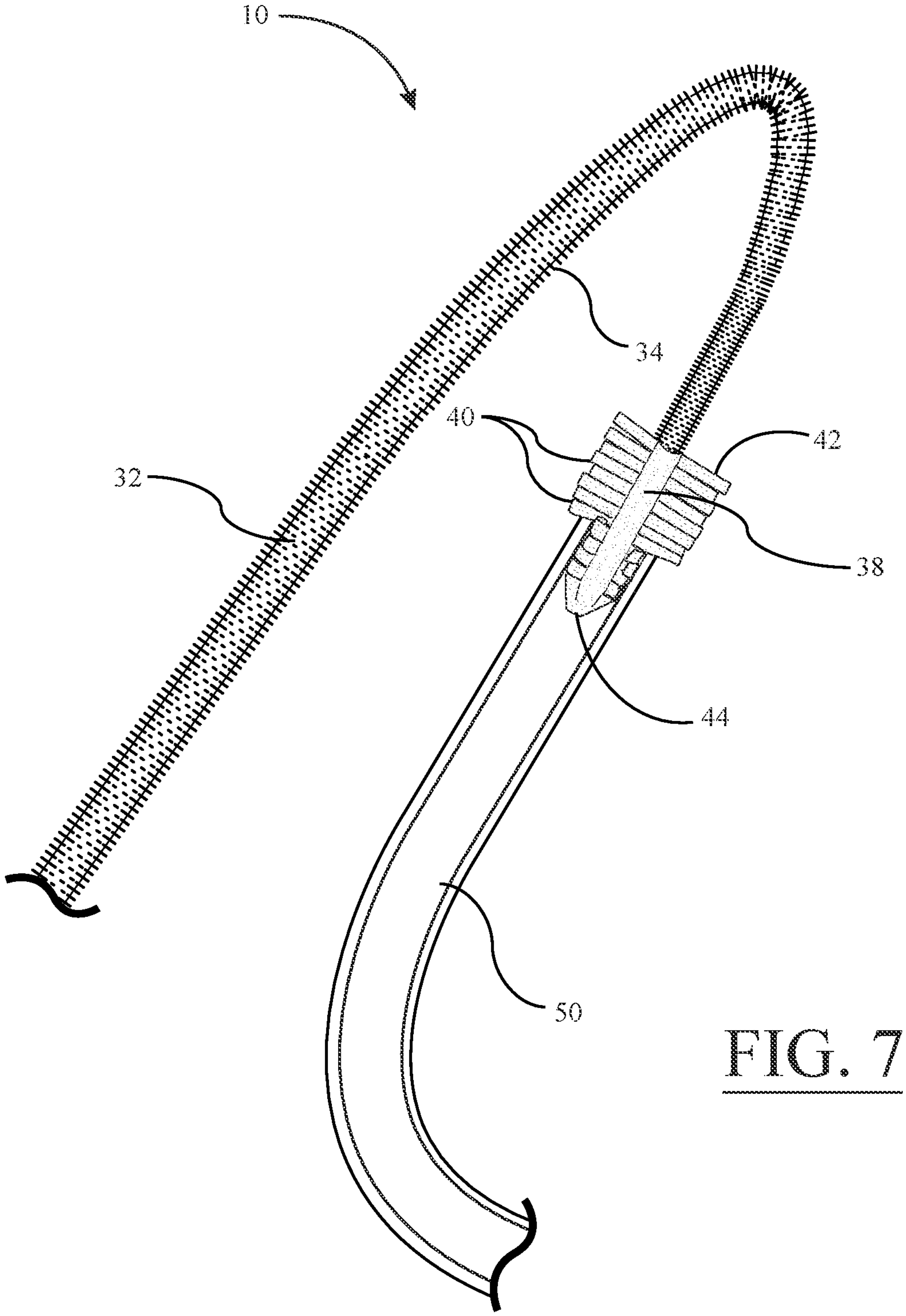
FIG. 7 is a perspective view illustrating the manner in which the pipe cleaning device of FIG. 1 may be used to clean the interior of a pipe.

In FIG. 7, an exemplary application of the pipe cleaning device 10 is illustrated. More specifically, FIG. 7 shows the inventive pipe cleaning device 10 being used in a pipe 50. As described above, the pipe cleaning device 10 is used to remove pipe scaling from the interior walls of a pipe. Referring again to FIG. 7, after insertion of the tip section 38 into the pipe 50, the pipe cleaning device 10 is rotated by a drill, thus scrubbing the interior wall of the pipe 50. The particular construction of the hook elements 42 on the tip section 38 allows the debris to be collected and grabbed by the pipe cleaning device 10. After grabbing the debris from the pipe interior wall, the device 10 is removed from the pipe. Advantageously, the spinning of the tip section 38 with the grappling micro-hooks 42 by the drill produces an abrasion power that is much greater than conventional straight brush bristles.

In one or more embodiments, the pipe cleaning device 10 is configured to be discarded after being used to remove the debris from the interior wall of the drain pipe. In other words, the elongated rod section 32 and tip section 38 of the pipe cleaning device 10 is disposable, and is designed for single cleaning of a drain. The used elongated rod section 32 and tip section 38 of the pipe cleaning device 10 with the collected debris can be safely and environmentally discarded. Then, a new pipe cleaning device 10 can be attached to the power tool adapter, and used to remove pipe scaling from the drain pipe.

It is readily apparent that the aforedescribed pipe cleaning device 10 offers numerous advantages. For example, the pipe cleaning device 10 enables a user to utilize the power of a power tool for rotating the pipe cleaning device 10 to dislodge and grab debris from an interior wall of a pipe. The pipe cleaning device 10 may be used for cleaning drains by removing pipe scaling and other debris that is collected on the interior wall of the pipe.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A pipe cleaning device, comprising:

an elongated rod section having a first end, a second end, and a rod axis, the first end of the elongated rod section being oppositely disposed relative to the second end of the elongated rod section; and a tip section connected to the second end of the elongated rod section, the tip section including a plurality of textile fingers extending radially outward from a central tip portion, at least some of the plurality of textile fingers being in a form of adjacent material strips separated from one another along a length of the tip section by respective slits, and the at least some of the plurality of textile fingers including a plurality of protruding elements projecting outwardly from textile finger surfaces of the adjacent material strips;

wherein the first end of the elongated rod section is configured to be coupled to a rotary motion input device that is sufficient to rotate the plurality of textile fingers of the tip section about the rod axis; and whereby, upon rotation of the plurality of textile fingers of the tip section, the plurality of protruding elements on the at least some of the plurality of textile fingers are configured to dislodge and grab debris from an interior wall of a pipe.

2. The pipe cleaning device according to claim 1, wherein the plurality of protruding elements on the plurality of textile fingers comprise a plurality of micro-hooks.

3. The pipe cleaning device according to claim 2, wherein the plurality of textile fingers are formed from a hook side of a hook-and-loop fastener textile material that comprises the plurality of micro-hooks.

4. The pipe cleaning device according to claim 1, wherein the plurality of textile fingers are arranged on opposed sides of the central tip portion of the tip section.

5. The pipe cleaning device according to claim 4, wherein the plurality of textile fingers are arranged in a generally rectangular configuration on the opposed sides of the central tip portion of the tip section.

6. The pipe cleaning device according to claim 4, wherein the tip section has a width between approximately one inch and approximately four inches so as to substantially correspond to an interior dimension of common sanitary pipe sizes.

7. The pipe cleaning device according to claim 1, wherein a distal end of the tip section is substantially V-shaped.

8. The pipe cleaning device according to claim 1, wherein the plurality of textile fingers are resilient and bendable so as to allow the tip section to fold over for insertion into a sink drain alongside a drain stopper.

9. The pipe cleaning device according to claim 1, further comprising a power tool adapter configured to couple the first end of the elongated rod section to the rotary motion input device, the power tool adapter includes an adapter body with a shank section for being inserted into a recess of the rotary motion input device.

10. The pipe cleaning device according to claim 1, wherein the rotary motion input device for rotating the elongated rod section is selected from the group consisting of: (i) a drill, (ii) a screwdriver, (iii) a power drill, (iv) a power screwdriver, and (v) a hand crank.

11. The pipe cleaning device according to claim 1, wherein the elongated rod section further includes an additional plurality of protruding elements projecting outwardly from the elongated rod section, the additional plurality of protruding elements being disposed at least partially around a periphery of the elongated rod section and along at least a portion of a length of the elongated rod section between the first end and the second end.

12. The pipe cleaning device according to claim 11, wherein the elongated rod section further comprises a central core portion and an outer covering bonded to the central core portion, the outer covering formed from a hook material strip, the hook material strip comprising the plurality of protruding elements of the elongated rod section, and the hook material strip being made from a hook side of a hook-and-loop fastener material.

13. The pipe cleaning device according to claim 12, wherein the central core portion is formed from a semi-flexible cable, the semi-flexible cable comprising a plurality of inner wires surrounded by an outer sheathing, the hook material strip being bonded to the outer sheathing of the semi-flexible cable.

14. The pipe cleaning device according to claim 12, wherein the central core portion is formed from a plastic core.

15. The pipe cleaning device according to claim 1, wherein the pipe cleaning device is disposable, and is configured to be discarded after being used to dislodge and grab debris from an interior wall of a pipe.

16. A pipe cleaning device, comprising:

an elongated rod section having a first end, a second end, and a rod axis, the first end of the elongated rod section being oppositely disposed relative to the second end of the elongated rod section;

a tip section connected to the second end of the elongated rod section, the tip section including a plurality of protruding elements projecting outwardly from the tip section, the plurality of protruding elements being disposed along at least a portion of a length of the tip section; and a power tool adapter configured to couple the first end of the elongated rod section to a powered rotary motion input device, the power tool adapter including an adapter body with a shank section for being inserted into a recess of the powered rotary motion input device;

wherein the first end of the elongated rod section is configured to be coupled to the powered rotary motion input device by means of the power tool adapter, the powered rotary motion input device being sufficient to rotate the plurality of protruding elements of the tip section about the rod axis; and whereby, upon rotation of the plurality of protruding elements of the tip section, the plurality of protruding elements are configured to dislodge and grab debris from an interior wall of a pipe.

17. The pipe cleaning device according to claim 16, wherein the powered rotary motion input device is selected from the group consisting of: (i) a power drill, and (ii) a power screwdriver.

* * * * *